United States Patent [19]

Lapeyre

[11] 4,170,281

[45] Oct. 9, 1979

[54] EXTRUDABLE FLEXIBLE MODULAR TOOTH DRIVEN CONVEYOR BELT

[75] Inventor: James M. Lapeyre, New Orleans, La.

[73] Assignee: The Laitram Corporation, New Orleans, La.

[21] Appl. No.: 811,965

[22] Filed: Jun. 30, 1977

[51] Int. Cl.² ............................................. B65G 15/30
[52] U.S. Cl. ................................... 198/844; 198/850; 74/231 C; 74/231 J; 74/236
[58] Field of Search ............. 74/231 R, 231 J, 243 C, 74/235, 236; 198/844, 850, 851, 853

[56] References Cited

U.S. PATENT DOCUMENTS

| | | | |
|---|---|---|---|
| 2,318,287 | 5/1943 | Brolin | 74/231 J |
| 2,627,756 | 2/1953 | Bendall | 74/236 X |
| 2,746,595 | 5/1956 | Kornylak | 198/850 |
| 3,602,364 | 8/1971 | Maglio | 198/853 |
| 3,870,142 | 3/1975 | Woltjen | 198/844 |
| 3,887,243 | 6/1975 | Chaumont | 74/231 C |
| 3,934,712 | 1/1976 | Jende | 198/851 |
| 4,063,463 | 12/1977 | Nordengren | 74/231 J |
| 4,084,687 | 4/1978 | Lapeyre | 198/850 |

FOREIGN PATENT DOCUMENTS 957872 11/1974 Canada ................................. 74/231 R Primary Examiner—Henry C. Yuen
Attorney, Agent, or Firm—Wilkinson, Mawhinney & Theibault

[57] ABSTRACT

The present disclosure is directed to a modular conveyor belt made from extruded flexible links which may be either of plastic or metal having ends joinable into an endless belt by an extruded substantially rigid jointing member which also cooperates with a notched sprocket to form a drive member for the belt. Due to their formation by extrusion the top surface of the links may be formed with flights of different geometric form for performing a multiplicity of conveying tasks. The particular geometry of the extruded modular link anchoring connectors and the complemental shape of the extruded substantially rigid jointing and drive member permits links to be assembled into an endless belt by merely sliding the jointing and drive member transversely across the ends of a pair of back to back flexible links.

3 Claims, 25 Drawing Figures

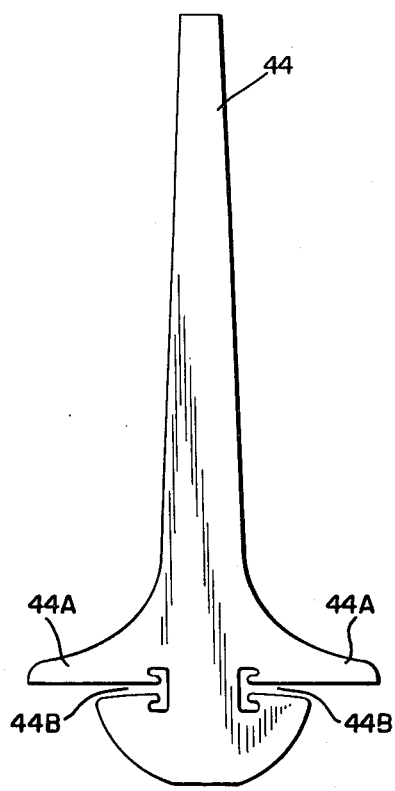
FIG.14
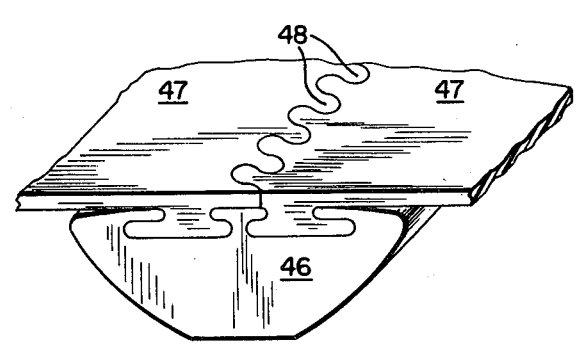
FIG.17
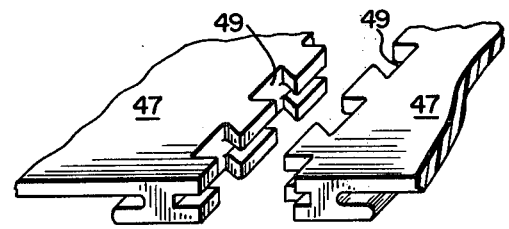
FIG.18
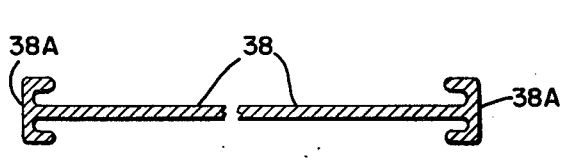
FIG.15
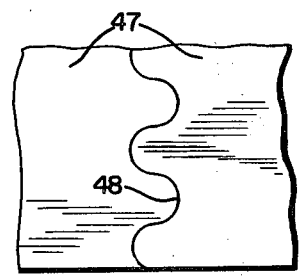
FIG.19
FIG.16
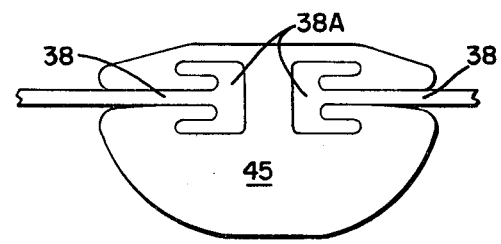

EXTRUDABLE FLEXIBLE MODULAR TOOTH DRIVEN CONVEYOR BELT

An object of the present invention is to provide an improved conveyor belt made from basically two parts, a multiplicity of extruded flexible links, the length and width of which may be varied, and a substantially rigid extruded jointing and drive member which not only functions to retain the links in a continuous belt form but which also acts as a gear tooth on its underside to engage geometrically complemental recesses about the periphery of a drive sprocket.

Another object of the present invention is to provide an endless conveyor belt of the type described upstanding from the conveying surface of which may be flights of varying geometric form and size for performing a multiplicity of conveying tasks.

A further object of the present invention is to provide a conveyor belt made up from extruded links all of which are identical for a given belt and which may be of any width or length dependent upon conveyor application all of which are joined by a substantially rigid jointing and drive member the length of which is equal to the width of the extruded flexible links.

A still further object of the present invention is the provision of a rigid jointing member which not only joins and holds the links together but forms on its underside a tooth for entering into driving engagement with one or more drive sprockets upon which the belt is supported having circumferentially spaced transverse recesses of complemental geometric form to the tooth on the underside of the jointing member.

Another object of the present invention is to provide a flexible conveyor belt of the type described above which may be constructed by extrusion of either plastic or metal dependent upon conveyor application.

With the foregoing and other objects in view the invention will be more fully described hereinafter and more particularly pointed out in the appended claims.

In the drawings in which like parts are denoted by reference characters throughout the several views:

FIG. 14 is a side elevational view of a modified form of jointing and drive member employed with the form of link shown in FIG. 8 having a large upstanding flight.

FIG. 15 is a view similar to FIG. 8 but lined for metallic extrusion.

FIG. 16 is a side elevational view of a modified form of jointing and drive member employed with the link form shown in FIGS. 8 and 15.

FIG. 17 is a fragmentary perspective view of the links and jointing and drive members wherein the links at the point of abutment to one another as scolloped vertically across the transverse width of the link.

FIG. 18 is a perspective view similar to FIG. 17 showing the links at their point of abutment vertically dovetailed.

FIG. 19 is a top plan view of FIG. 17.

Figure 1:
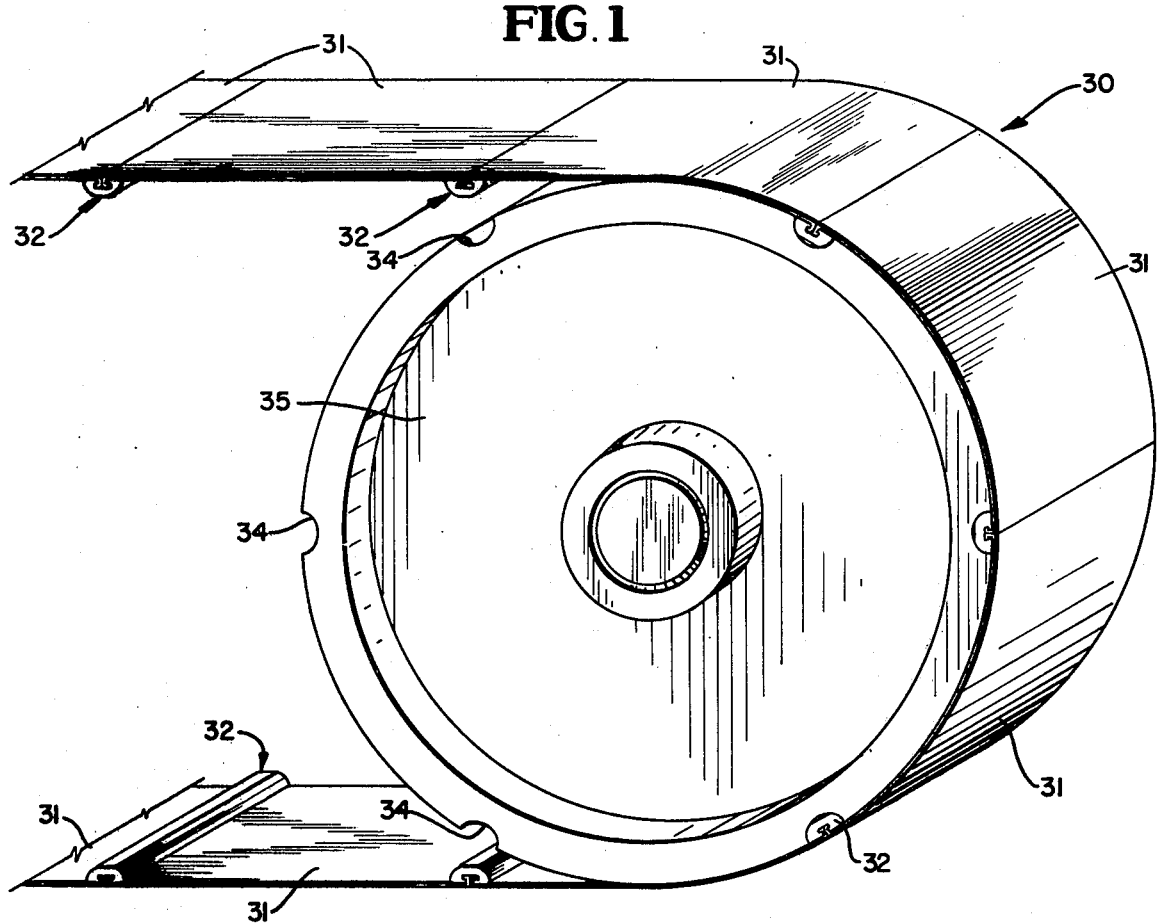
FIG. 1 is a fragmentary perspective view of a modular flexible link conveyor belt constructed in accordance with the present invention mounted on a notched out drive sprocket.

Referring now to the drawings and for the moment to FIGS. 1 through 4 inclusive, a basic conveyor belt is shown at 30 as being made up of extruded flexible links 31 joined together by a series of extruded substantially rigid jointing and drive members 32. The underside of the member 32 has a driving tooth configuration 33 for entering driving engagement with complemental transverse grooves 34 across the face of and circumferentially about drive sprockets or drum 35.

Figure 3:
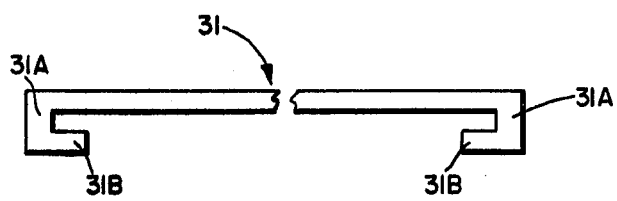
FIG. 3 is an end view of an extruded link with a portion broken away.

As shown in FIG. 3 the flexible links 31 have a pair of right angle legs 31A, one at each end, having feet 31B directed toward each other. The feet 31B are spaced from the flexible link 31 approximately a distance equal to the thickness of the link 31.

Figure 4:
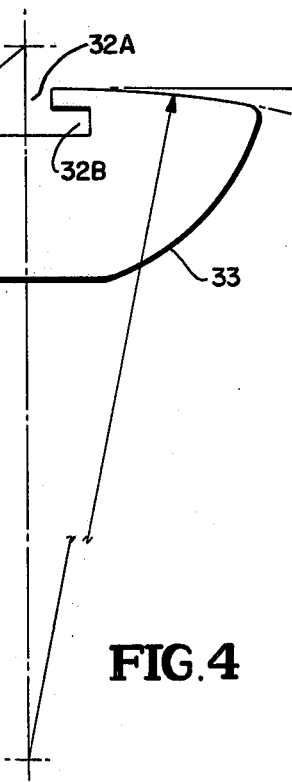
FIG. 4 is an end view of the jointing and drive member for joining the extruded modular flexible links and for driving the conveyor belt thus formed.

The links 31 are joined and retained in a belt configuration by an extruded substantially rigid jointing and drive member 32 which as shown in FIG. 4 has an inverted T slot in its top wall comprising a small opening 32A running longitudinally of the member 32 which opens into a large rectangular opening 32B. The width of the opening 32A is equal to two of the leg width 31A placed back to back while the opening 32B is equal to the two feet 31B of the links placed back to back as shown in FIGS. 1 and 2.

Figure 2:
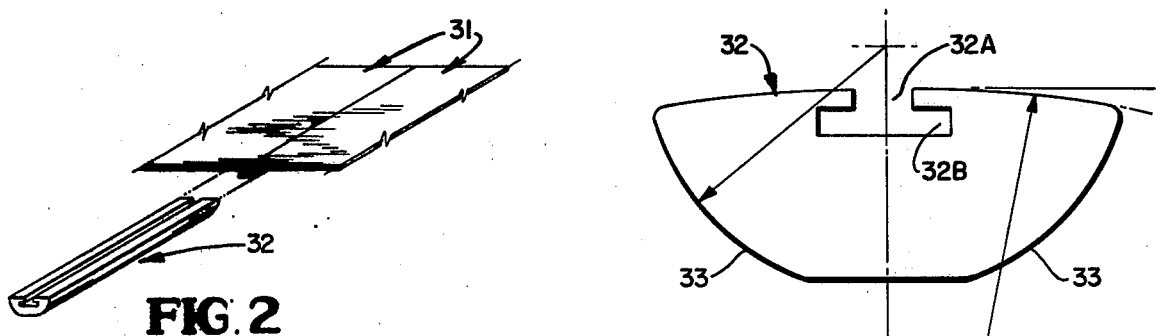
FIG. 2 is a fragmentary perspective view of the flexible modular links being connected by an extruded substantially rigid jointing and drive member.

The links 31 are locked into a belt configuration by moving the jointing and drive member with its longitudinal axis transverse to the width of the two links so that the legs 31A enter the opening 32A and the feet 31B enter the opening 32B to make up a conveyor belt as shown in FIG. 1, the elements of which are firmly locked together.

Figure 5:
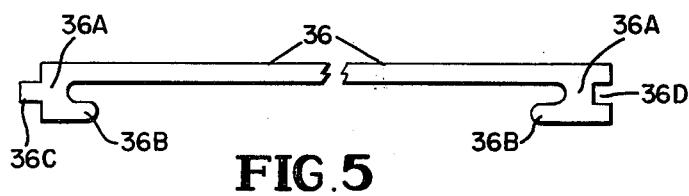
FIG. 5 is a side elevational view of a modified form of extruded modular flexible link in accordance with the present invention broken away.
Figure 6:
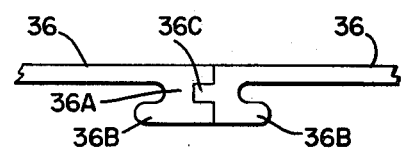
FIG. 6 is a fragmentary side elevational view of a pair of links in accordance with FIG. 5 placed together prior to application of the jointing and drive member.
Figure 7:
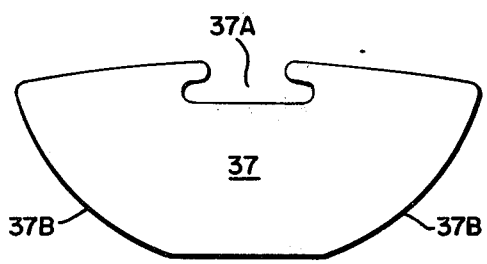
FIG. 7 is an end elevational view of the form of jointing and drive member employed with the links shown in FIGS. 5 and 6.

Referring now to FIGS. 5 through 7 inclusive, a modified form of extruded flexible link is shown at 36 having legs 36A and feet 36B directed toward one another. One of the legs 36B has a square projection 36C while the other leg as a square recess 36D complemental to the projection 36C so that they can be mated as shown in FIG. 6. The extruded substantially rigid jointing and drive member 37 has on its topside a slot 37A geometrically congruent with the external configuration of the mated legs 36A and their oppositely extended feet 36B. The member 37 is introduced with its longitudinal axis transverse to the width of the flexible links 36 so that the legs 36A and feet 36B enter and are locked in the slot 37A similar to the manner of assembly of FIGS. 1 and 2. The bottom of the member 37 has a drive tooth configuration as shown at 37B.

Figure 8:
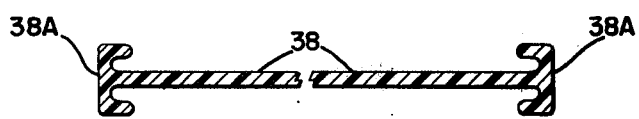
FIG. 8 is a further modified form of flexible link shown in longitudinal section and lined for plastic.
Figure 9:
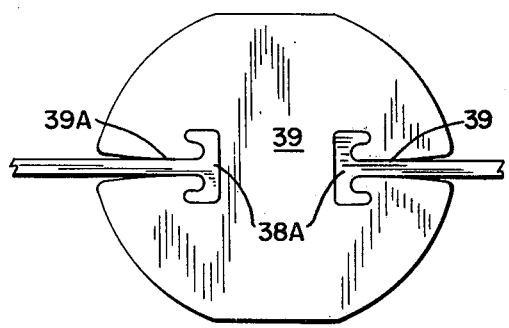
FIG. 9 is an end elevational view showing a pair of links in accordance with FIG. 8 joined by the jointing and drive member.

Referring now to FIG. 8 a further form of modified extruded flexible link 38 is shown of plastic having T-shaped ends 38A. These links 38 are joined by a substantially rigid jointing and drive member 39 or member 40 each having T-shaped slots 39A and 40A complemental to the T-ends 38A of links 38. As in the prior embodiments the rigid jointing and drive members 39,40 are introduced with their longitudinal axis transverse to the longitudinal axis of the links. Each jointing and drive member 39,40 have a drive tooth configuration 39A,40A.

Figure 11:
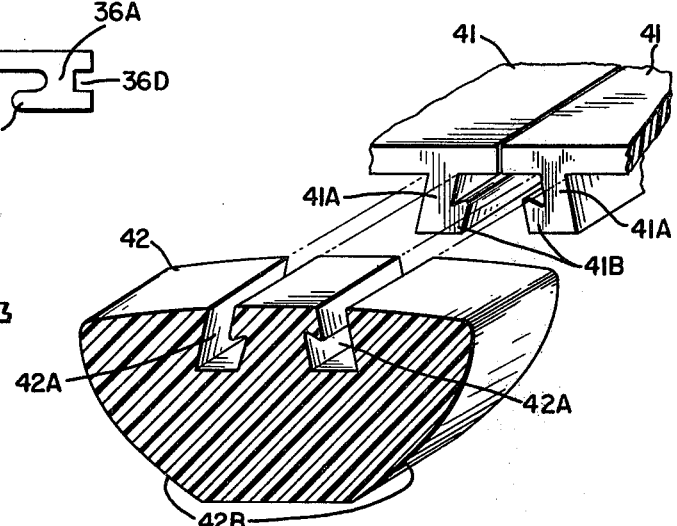
FIG. 11 is a fragmentary perspective view of a further form of modified link and jointing and drive member in assembly stage.
Figure 12:
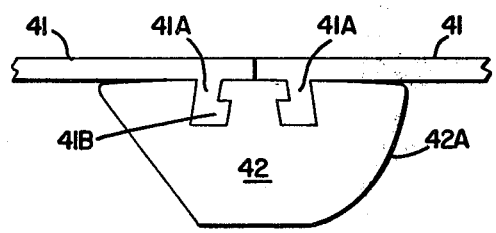
FIG. 12 is a fragmentary side elevational view of the elements of FIG. 11 in assembled condition.
Figure 13:
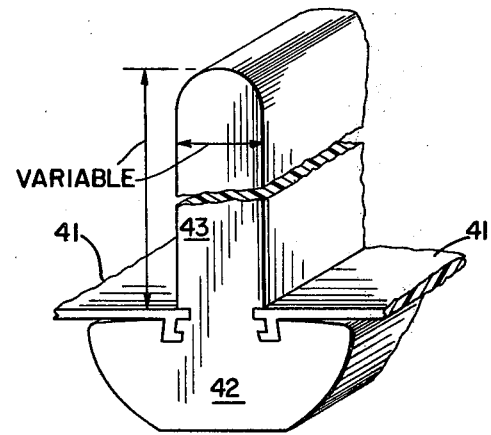
FIG. 13 is a fragmentary perspective view of a modified form of jointing and drive member having a flight for use with the form of links shown in FIGS. 11 and 12.
Figure 10:
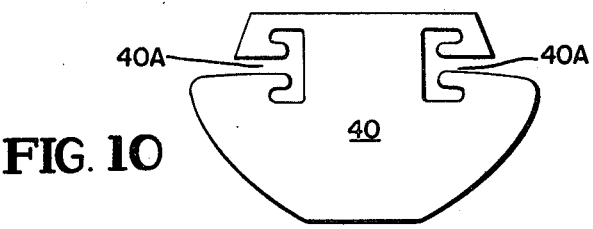
FIG. 10 is an end view of a modified form of jointing and drive member employed with the links of FIG. 8.

Referring now to the embodiment shown in FIGS. 11 through 13, the extruded flexible links 41 have downwardly angled legs 41A off which extend upwardly inclined feet 41B. When the links are abutted as shown in FIG. 11, the substantially rigid jointing and drive member 42 having slots 42A complemental to the legs and feet 41A, 41B are slid across the links 41 to join them as shown in FIGS. 11 through 13. The bottom of the jointing and drive member 42 has a drive tooth configuration 42B. As shown in FIG. 13, between the links 41, a conveyor flight projection 43 upstands, its width and height depending upon conveyor application.

FIG. 14 shows a larger, firmer flight projection 44 having filleted support feet 44A which cooperated with T-shaped slots 44B for interconnecting links.

FIG. 15 shows an embodiment of the links having T-shaped ends wherein the links are of an extruded metallic alloy which permits of the link flexibility to conform to the driving sprocket 35.

FIG. 16 is a further form of modified substantially rigid jointing and drive member 45 having T-shaped slots 45A for connecting links having T-shaped ends.

Referring now to FIGS. 17 through 19, the links 38 are further locked together in addition to the substantially rigid jointing and drive member 46 by vertically scolloping the ends of the links 47 at 48 or vertically dovetailing at 49. These configurations resist longitudinal separation.

Figure 20:
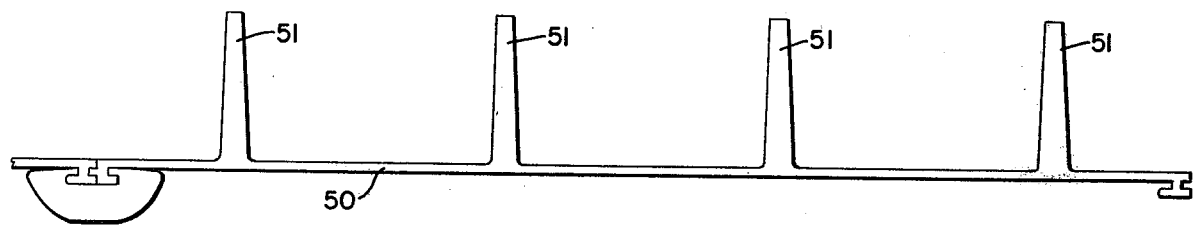
FIG. 20 is a side elevational view of a modified form of extruded link having large spaced apart flights on its top surface.

Referring now to FIGS. 20 through 25, and for the moment to FIG. 20, a link 50 is shown being of the type illustrated and described with respect to FIGS. 5 and 6. Upstanding from the top surface of the flexible link web are a plurality of spaced apart flights 51. The height and spacing of the flights 51 depend on the conveyors application consideration being directed to the objects being conveyed and the angle of inclination of the conveyor working surface.

Figure 21:
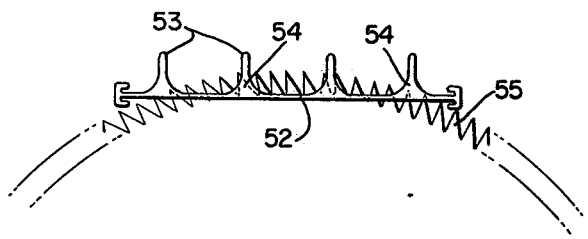
FIG. 21 is a side elevational view of a modified form of extruded link having spaced apart filleted mini-flights and showing a milling saw passing through the bottom thereof.

The form of extruded flexible link shown in FIG. 21 has a main body 52 with a plurality of mini-flights 53 filleted at 54 and closely spaced for conveying such food items as cherries, olives, pickles, etc. A milling saw 55 is shown.

Figure 22:
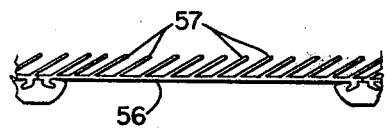
FIG. 22 is a side elevational view of a modified form of extruded link having thin upwardly closely spaced flights to cushion objects dropped on conveyor belt.

In the specie of flexible extruded link shown in FIG. 22 there are upstanding from the link 56 a plurality of thin closely spaced upwardly inclined projections 57 to absorb shock to articles falling on the conveyor for transport such as light bulbs, glassware, crockery, china, instruments, etc. This configuration also acts as a snagger and promotes a more positive gripping action for up hill travel.

Figure 23:
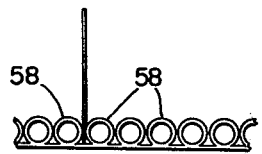
FIG. 23 is a fragmentary side elevational view of a modified form of extruded link having hollow abutting tubular ribs in immediate abutting contact to grip objects therebetween.

The specie of extruded flexible link shown in FIG. 23 shows a plurality of hollow circle upstanding grippers 58 in abutting engagement to hold objects upright for travel through acid baths or for an inverted belt for overhead delivery.

Figure 24:
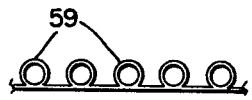
FIG. 24 is a view similar to FIG. 23 with the hollow tubular ribs spaced apart for roll up plastic louvers.

FIG. 24 shows an extruded flexible link construction similar to FIG. 23 except that the hollow circle members 59 are spaced further apart in a non-gripping relationship.

Figure 25:
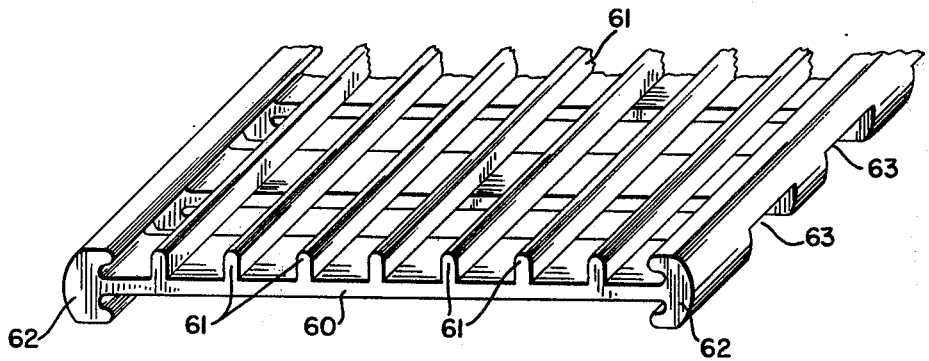
FIG. 25 is a fragmentary perspective view of an extruded flexible link module in accordance with the present invention having spaced apart upstanding flights on the top side and being milled out on the underside.

The form of extruded plastic flexible link shown in FIG. 25 has a web 60 upstanding from the surface of which are a plurality of flights 61 and the T-shaped end connectors 62. This form of link has also been milled out at 63 to the bottom of the flights 61.

The preferred plastic material of which the belt links are extruded is such plastics as acetal, polypropylene or polyethylene which will permit the web of the link to flex about the sprocket contour as it is driven about same. The links may be injection molded or extruded. When the links are made of metal they may be either extruded or rolled.

This description of material also applies to the extruded rigid jointing and drive members.

What I claim is:

1. For use with a pair of drive sprockets having driving notches transversely of their rotary axis and extending across their load bearing face:

(a) a modular conveyor belt comprising flexible link modules having link anchoring connectors running across the width of the link modules, said link anchoring connectors being formed with two right angle end legs having a spaced foot directed toward each other, one leg having an open ended square recess to mate adjacent links, (b) an extruded substantially rigid jointing and drive member having openings running the length of the extrusion and being complemental to the link anchoring connectors of a pair of link modules to restrain the links in abutting engagement with said jointing and drive member, said substantially rigid jointing and drive members are extruded with a central top opening to a width equal to two right angle link legs placed back to back and an undercut opening equal to the link module feet directed away from each other, and (c) the bottom and sides of said jointing and drive member being geometrically complemental to the transverse driving notches of the drive sprockets to be driven thereby.

2. A modular link conveyor as claimed in claim 1 wherein said flexible link module is extruded of a flexible thermoplastic material.

3. A modular link conveyor as claimed in claim 1 wherein said flexible link module is extruded of an alloy of metal having flexible properties when set up.

* * * * *